US012799987B2

(12) United States Patent
Boudin et al.

(10) Patent No.: US 12,799,987 B2
(45) Date of Patent: Nov. 17, 2026

(54) VIBRATION DAMPING DEVICE

(71) Applicant: VALEO EMBRAYAGES, Amiens Cedex (FR)

(72) Inventors: Jerome Boudin, Cergy Pontoise (FR); Paul Farineaux, Cergy Pontoise (FR); Mouhsine Errehymy, Cergy Pontoise (FR)

(73) Assignee: VALEO EMBRAYAGES, Amiens Cedex (FR)

( * ) Notice: Subject to any disclaimer, the term of this patent is extended or adjusted under 35 U.S.C. 154(b) by 0 days.

(21) Appl. No.: 19/285,792

(22) Filed: Jul. 30, 2025

(65) Prior Publication Data

US 2026/0036175 A1 Feb. 5, 2026

(30) Foreign Application Priority Data

Jul. 31, 2024 (FR) ....................................... 2408492

(51) Int. Cl.
*F16C 3/12* (2006.01)
*F16D 3/12* (2006.01)
(Continued)

(52) U.S. Cl.
CPC ................. *F16D 3/12* (2013.01); *F16D 3/66* (2013.01); *F16D 7/025* (2013.01);
(Continued)

(58) Field of Classification Search
CPC ...... F16F 15/123; F16F 15/129; F16F 15/131; F16F 15/13438; F16F 15/1343;
(Continued)

(56) References Cited

U.S. PATENT DOCUMENTS 4,351,167 A * 9/1982 Hanke ................... F16F 15/161 192/208
4,537,579 A * 8/1985 Loizeau ................ F16D 13/686 192/205

(Continued)

FOREIGN PATENT DOCUMENTS

DE 10 2019 121 248 A1 2/2021
DE 10 2020 116 574 A1 12/2021

(Continued)

OTHER PUBLICATIONS

Preliminary French Search Report issued Feb. 12, 2025 in French Application FR2408492 filed on Jul. 31, 2024, 6 pages (with English Translation of Categories of Cited Documents & Written Opinion).

*Primary Examiner* — Daniel J Wiley
(74) *Attorney, Agent, or Firm* — Oblon, McClelland, Maier & Neustadt, L.L.P.

(57) ABSTRACT

A vibration damping device for an automotive vehicle includes a torque transmission plate, two rotatably connected guide elements that are coaxial along an axis of rotation and positioned on either side of the torque transmission plate, and helical compression springs bearing on the torque transmission plate and the guide elements by means of seats positioned on the ends of the springs. Each seat includes a frontal face suitable for interacting with the end of the springs, comprising a centring flange, the centring axis of which is coincident with the axis of the springs. A dorsal face defines a geometric plane backing onto the frontal part, and an indentation extending inwards from the dorsal face.

20 Claims, 7 Drawing Sheets

(51) Int. Cl.

| | |
|---|---|
| ***F16D 3/66*** | (2006.01) |
| ***F16D 7/02*** | (2006.01) |
| ***F16F 15/134*** | (2006.01) |

(52) U.S. Cl.
CPC .. *F16F 15/13453* (2013.01); *F16F 15/13469* (2013.01); *F16F 2222/08* (2013.01); *F16F 2232/02* (2013.01); *F16F 2236/08* (2013.01)

(58) Field of Classification Search
CPC ............... F16F 15/137; F16F 15/13453; F16F 15/13469; F16F 15/134; F16D 3/12; F16D 3/66; F16D 7/025
See application file for complete search history.

(56) References Cited

U.S. PATENT DOCUMENTS

| | | | | | |
|---|---|---|---|---|---|
| 4,904,226 | A | | 2/1990 | Chasseguet et al. | |
| 4,996,892 | A | * | 3/1991 | Yamamoto | F16D 47/02 192/70.27 |
| 5,052,244 | A | * | 10/1991 | Kamiya | F16F 15/13446 192/205 |
| 5,065,642 | A | * | 11/1991 | Kagiyama | F16F 15/137 192/214.1 |
| 5,465,635 | A | * | 11/1995 | Kono | F16F 15/12 74/595 |
| 5,711,191 | A | * | 1/1998 | Mokdad | F16F 15/139 192/205 |
| 5,803,442 | A | * | 9/1998 | Despres | F16F 15/12313 192/106 R |
| 6,287,205 | B1 | * | 9/2001 | Bonfilio | F16D 3/12 192/214.1 |
| 8,398,492 | B2 | * | 3/2013 | Takeshita | F16F 15/1297 464/68.41 |
| 8,795,092 | B2 | * | 8/2014 | Verhoog | F16F 15/129 464/68.4 |
| 9,133,905 | B2 | * | 9/2015 | Schierling | F16F 15/145 |
| 11,746,832 | B2 | * | 9/2023 | Dast | F16F 15/12326 464/68.1 |

FOREIGN PATENT DOCUMENTS

| | | | |
|---|---|---|---|
| FR | 3 099 531 | B1 | 7/2021 |
| WO | WO 2017/051594 | A1 | 3/2017 |

* cited by examiner

VIBRATION DAMPING DEVICE

The present invention relates to a vibration damping device for an automotive vehicle. The automotive vehicle may be a so-called commercial vehicle, the latter being for example a heavy-duty vehicle, a public transport vehicle, or an agricultural vehicle.

More specifically, the invention relates to an improvement to the vibration damping device for an automotive vehicle, such as a friction clutch disc or a dual-mass flywheel. The vibration damping device is positioned generally between the combustion engine and the gearbox in order to filter out the cyclic irregularities originating from the drive shaft such that the driven shaft(s) is/are free of these cyclic irregularities or weakly affected by these cyclic irregularities. In the context of a manual gearbox or a robotised gearbox, a clutch mechanism fastened to the flywheel, also known as an inertia wheel, applies a clamping force to the friction clutch disc so as to transmit the torque produced by the engine.

The friction clutch disc conventionally comprises annular friction linings fastened to a support, which is itself attached to a torque transmission plate. Two guide elements positioned on either side of the plate are mounted on a central hub rotationally connected to the driven shaft of the gearbox. Helical compression springs are positioned circumferentially between the guide elements and the plate, the transmission of the torque and the filtering out of engine cyclic irregularities taking place by successive compression and relaxing of the springs. In order to improve the kinematics of the helical compression springs within the friction clutch disc, it is known practice to add metal seats between the springs and the coaxial parts formed by the guide elements and the plate.

Document EP3604853 A1 describes a friction clutch disc having metal seats acting between at least one of the spring ends and one and/or the other of the coaxial parts.

Each seat supports a sub-assembly of three concentric springs. The springs and the seats are received in recesses formed in the coaxial parts. To that end, each metal seat comprises a frontal part for supporting and/or centring the end of the springs with which it interacts, and a dorsal part backing onto the frontal part and having a protruding bar portion that provides a pivot connection with one and/or the other of the coaxial parts. The guide elements and the plate comprise apertures having shapes complementary to the bar portion of the seat. The axis of the bar portion, which is also the axis of the pivot connection, is situated substantially in the plane of the dorsal part of the seat.

However, in operation, due to the centrifugal forces that are applied to the three concentric springs and the seats, it is possible for the seats to be ejected from the apertures. This ejection of the seats results in the bar portion exiting its recess in the coaxial parts radially outwards, and the pivot connection function is then no longer provided. This ejection causes wear of the contacts between each seat and one and/or the other of the coaxial parts. In addition, this ejection of the seats causes more significant friction between the springs and a radially outer part of the recesses of the coaxial parts that receive them. In EP3604853 A1, the ejection of the seat is accentuated by the combined mass of the three concentric springs. The mass of the seat also contributes to the ejection phenomenon.

One aim of the invention is to provide seats that cannot be ejected during the operation of the vibration damping device that comprises them.

The invention aims to overcome these technical problems by proposing an improved vibration damping device using a seat that has novel pivoting kinematics with the guide elements and the torque transmission plate.

To this end, the present invention proposes a vibration damping device for an automotive vehicle, comprising:

- a torque transmission plate;
- two rotatably connected guide elements that are coaxial along an axis of rotation and positioned on either side of said torque transmission plate;
- helical compression springs bearing on the torque transmission plate and the guide elements by means of seats positioned on the ends of the springs, wherein each seat comprises:
- a frontal face suitable for interacting with the end of the springs, comprising a centring flange, the centring axis of which is coincident with the axis of the springs,
- a dorsal face defining a geometric plane P backing onto the frontal part, and
- an indentation extending inwards from the dorsal face, the vibration damping device being notable in that each seat bears on protuberances formed respectively on the torque transmission plate and the two guide elements so as to interact about a pivot connection, and the protuberances enter the indentation, which is common to the torque transmission plate and the two guide elements.

This vibration damping device, according to the invention, has the advantage of greatly limiting the risk of ejection of the seats during phases in which the torque to be transmitted is low or when the speed of rotation is high, due to the presence of the indentation. The indentation has large dimensions in order to receive the protuberances of the torque transmission plate and the two guide elements. This indentation greatly decreases the mass of the seat compared to a seat known from the prior art, which limits the risk of ejection of the seat out of the pivot connection.

In addition, the axis of the pivoting movement of the seat is at a distance from the dorsal face and, consequently, from the frontal face of the seat. This prevents the detachment of the pivot connection between the torque transmission plate and the seat and therefore prevents the complete ejection of the seat during operation on a vehicle.

Because material is added to the torque transmission plate by means of the protuberances, the mechanical strength of the torque transmission plate is not affected by the presence of the seats. The vibration damping device will be able to transmit more torque.

For example, the indentation may be produced in the form of a central cavity. The indentation may also be produced in the form of a groove having an elongate shape that emerges on the edges of the seat.

Preferably, the indentation is concave and comprises a rounded bottom defined by a pivoting radius, the protuberance of the torque transmission plate and/or the protuberances of the two guide elements bearing on the pivoting radius of the rounded bottom. As a result, the surface area of the seat in contact with the torque transmission plate is increased. The contact pressure decreases, thereby helping to reduce wear at the interface of the seat with the torque transmission plate.

Advantageously, the indentation comprises two bearing surfaces arranged to bear on the protuberances of the torque transmission plate and the two guide elements when the springs are compressed, each bearing surface being tangent to the pivoting radius of the rounded bottom.

According to one variant of the invention, the indentation has, in cross-section in the mid-plane P' passing along the axis of the springs, a prismatic shape comprising the two substantially planar bearing surfaces moving away from each other in the direction of the dorsal face, the prismatic shape having an angle α of between 30° and 70°.

According to another variant of the invention, the bearing surfaces are curved, for example with an involute or polynomial.

According to one aspect of the invention, the torque transmission plate and the two guide elements each comprise at least one window for receiving the springs and two seats, each window comprising two protuberances positioned facing each other. For example, the torque transmission plate may comprise between three and six windows evenly distributed about the axis of rotation.

Preferably, each window comprises a radially outer band, two radial support surfaces supporting the convex protuberances, and a radially inner edge, so as to form a closed recess suitable for receiving the springs and seats.

According to one aspect of the invention, each protuberance comprises a rounded end surface and two substantially planar sides, the substantially planar sides being the sides of a prismatic shape having an acute angle β of between 20° and 60°, which move away from each other in the direction of the radial support surface.

Preferably, the angle α of the indentation is greater than the acute angle β of the protuberance. The seat may thus pivot freely about the protuberance of the torque transmission plate. The difference in angle between the indentation and the protuberance is of the order of 10°.

According to one aspect of the invention, the indentation is a central cavity that comprises two lateral flanges that respectively bear on the outer walls of the two guide elements.

Preferably, the central cavity penetrates beyond the frontal face of the seat in the direction of the axis of the springs. Advantage is thus taken of the material available on the centring flange. As a result, the pivoting axis of the seat is at a distance from the dorsal face of the seat. The guiding of the seat on the protuberances of the torque transmission plate and the two guide elements is thus improved. This prevents the detachment of the pivot connection between the torque transmission plate and the seat and therefore prevents the complete ejection of the seat during operation on a vehicle.

According to another aspect of the invention, the indentation is a groove having an elongate shape that emerges on the edges of the seat, and the rounded bottom of the indentation comprises spacer lugs that extend in the direction of the torque transmission plate from the rounded bottom and are interposed between the torque transmission plate and the two guide elements.

The invention may have one or another of the features described below combined with each other or taken independently of each other:

- the central cavity comprises, in addition to a rounded bottom, two bearing surfaces and two lateral flanges.
- the seat comprises at least one step protruding from the frontal face and suitable for interacting with the end of the springs, the step comprising the centring flange.
- the rounded bottom is common to the protuberances of the torque transmission plate and the two guide elements.
- the protuberances of the torque transmission plate and the protuberances of the two guide elements are geometrically identical.
- the protuberance has a convex shape.
- the space available along the direction of the axis of rotation between the protuberance of the torque transmission plate and one of the protuberances of the two guide elements is smaller than the thickness of the torque transmission plate.
- the rounded bottom of the indentation comprises spacer lugs that are interposed between the torque transmission plate and the two guide elements.
- the rounded end surface of the protuberance has a radius that complements the pivoting radius of the rounded bottom.
- the centre of the complementary radius of the rounded end surface is circumferentially offset relative to the lateral bearing surface of the window.
- the lateral bearing surface has a first edge and a second edge that are suitable for coming into abutting contact with the dorsal face of the seat when the pivot connection is implemented, the two edges not being parallel to each other.
- the central cavity of the seat has a concave shape and extends along the axis Y from the dorsal face.
- the vibration damping device comprises a first inertial mass, the first inertial mass being attached or fastened to one of the guide elements.
- the vibration damping device comprises a second inertial mass, the second inertial mass being attached, directly or indirectly, to the torque transmission plate.
- the vibration damping device comprises a series of sub-assemblies of concentric helical compression springs supported by two seats, the sub-assemblies being evenly distributed about the axis of rotation.
- a sub-assembly comprises for example two concentric helical compression springs or for example three concentric helical compression springs.

Advantageously but optionally, the seat may have at least one of the following features:

- the spring seat may be obtained by moulding a metal or a synthetic material using compressed powder technology.
- the spring seat may be obtained by shaping a metal or a synthetic material using additive manufacturing technology.

The invention further relates, according to another of its aspects, to a friction clutch disc comprising a friction disc provided with friction linings and a vibration damping device including all or some of the aforementioned features, wherein the friction disc is attached to one of the guide elements or to the torque transmission plate.

The invention also relates, according to another of its aspects, to a dual-mass flywheel comprising a first inertial mass and a second inertial mass that are coaxial along an axis of rotation X, and a vibration damping device including all or some of the aforementioned features, wherein the first inertial mass is held by the guide elements and the second inertial mass is held by the torque transmission plate.

The invention will be better understood upon reading the following description, which is given solely by way of example and with reference to the appended drawings, in which.

Figure 1:
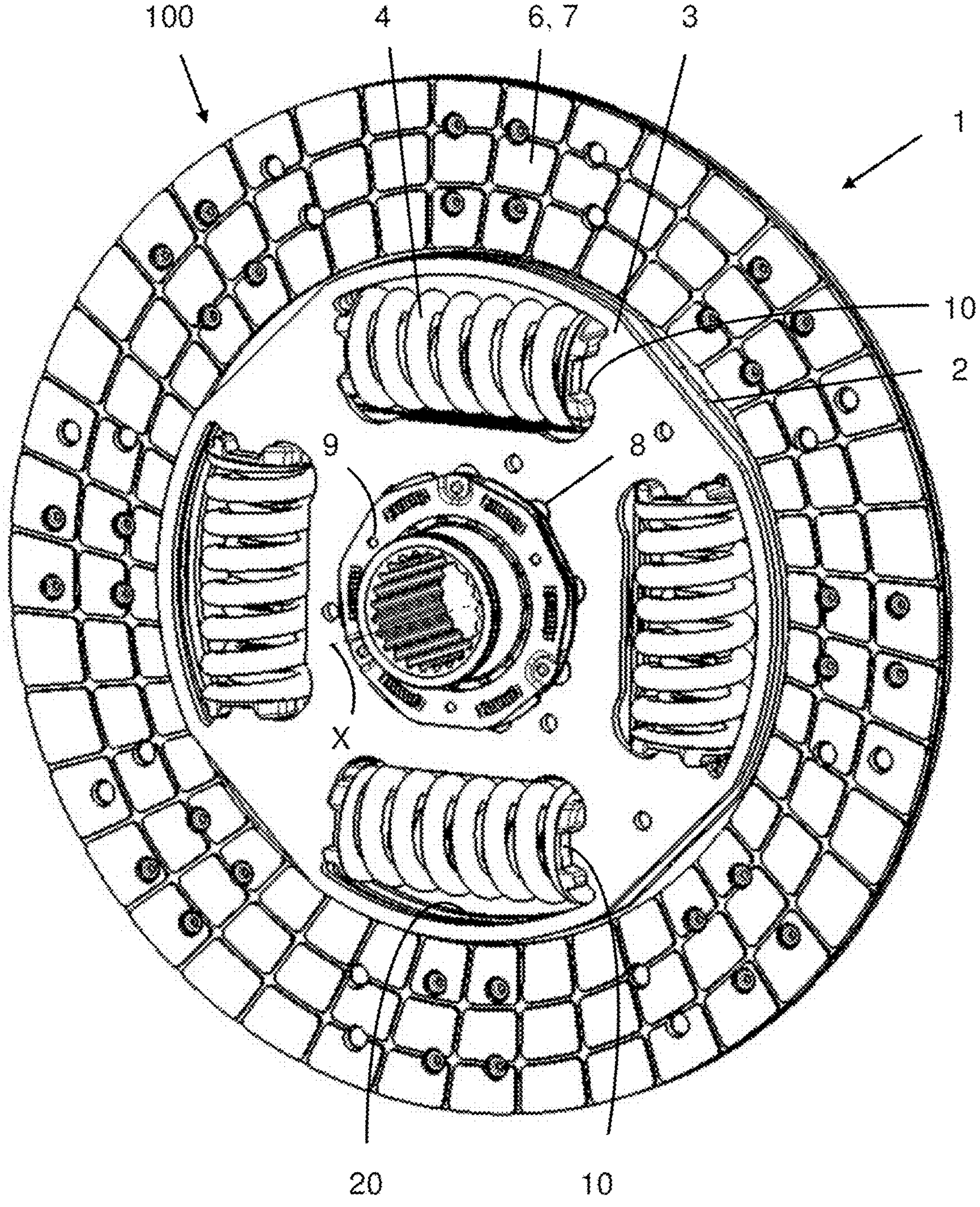
FIG. 1 is an isometric view of a friction clutch disc incorporating a vibration damping device according to a first embodiment of the invention.
Figure 2:
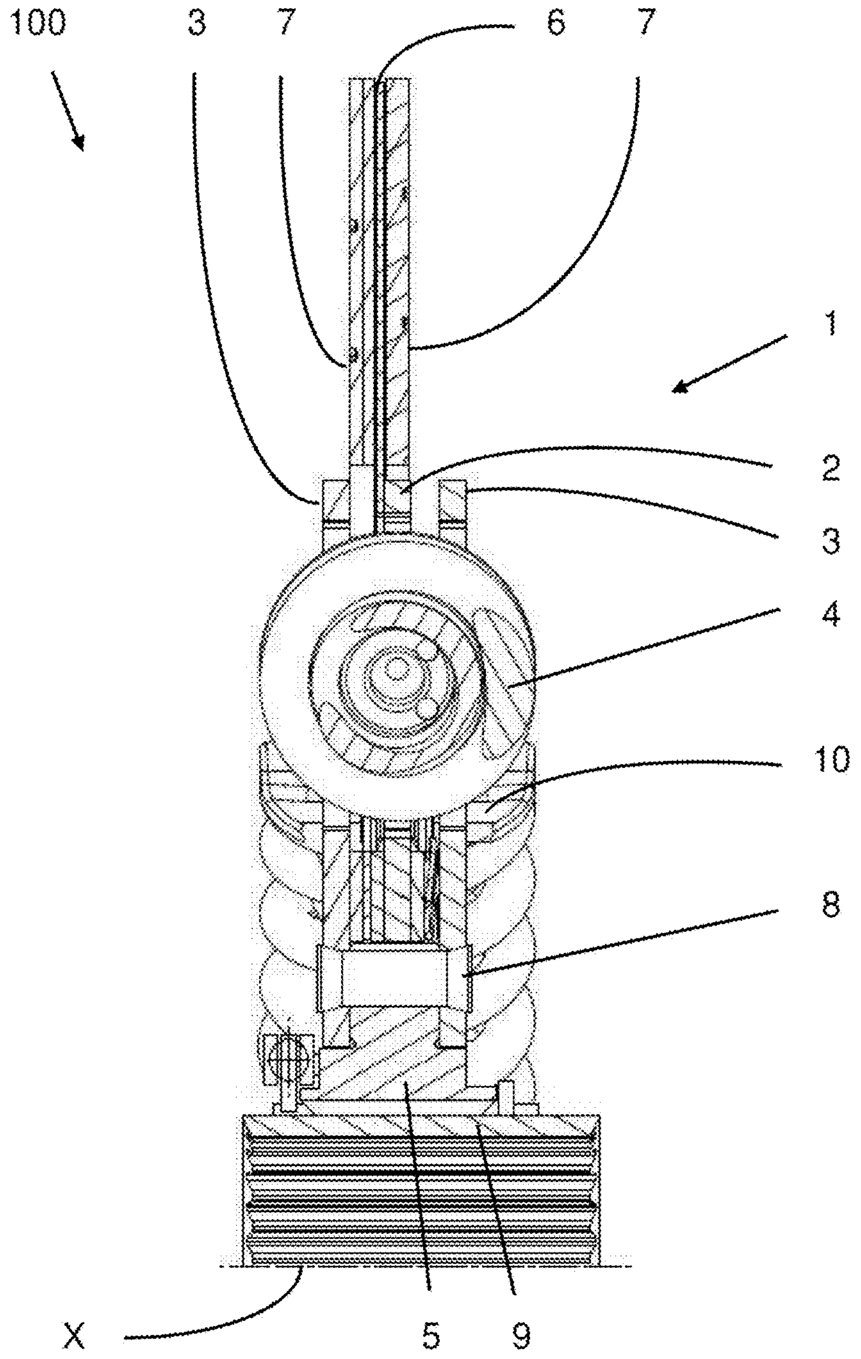
FIG. 2 is a cross-sectional view of the friction clutch disc according to the first embodiment of the invention in FIG. 1.
Figure 3:
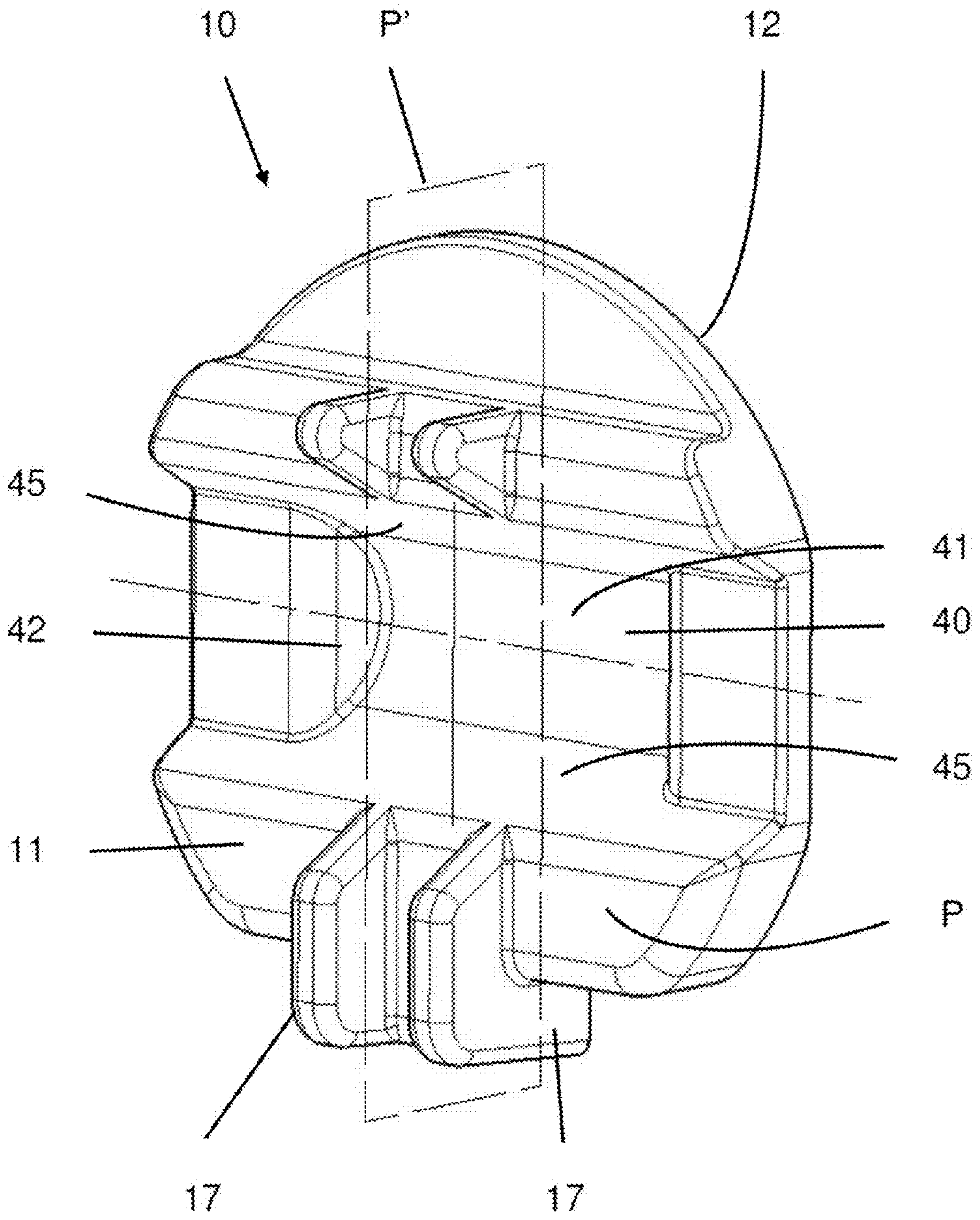
FIG. 3 is an isometric view of a friction seat according to the first embodiment of the invention in FIG. 1.

Hereinafter in the description and the claims, in a non-limiting manner and in order to facilitate the understanding thereof, the terms "front" or "rear" will be used along the direction relative to an axial orientation determined by the axis of rotation X of the transmission of the automotive vehicle, and the terms "inner/internal" or "outer/external" will be used relative to the axis of rotation X and in a radial orientation orthogonal to said axial orientation.

FIGS. 1 to 6 illustrate a friction clutch disc 100 incorporating the vibration damping device 1 according to a first embodiment of the invention.

The friction clutch disc 100, having an axis of rotation X, comprises a vibration damping device 1 including, in a conventional manner, a torque transmission plate 2, guide elements 3 and helical compression springs 4. The friction clutch disc illustrates, in the present case, a so-called "symmetrical" architecture and comprises a friction disc 6 attached to the torque transmission plate 2. The friction disc 6 is provided with friction linings 7 distributed on the periphery of the torque transmission plate 2 about the axis of rotation X and suitable for rubbing against a pressure plate of a clutch mechanism. The two guide elements 3, also known as guide washers 3, are positioned on either side of the torque transmission plate 2, trapping the helical compression springs 4 in interposed recesses.

A clutch mechanism fastened to the flywheel (not shown) applies a clamping force to the friction clutch disc 1 so as to transmit the torque produced by the engine to the gearbox.

The drive torque enters the friction clutch disc by means of the friction disc 6 and exits by means of a central hub 5 positioned between the two guide washers 3. The central hub 5 is connected to the guide washers 3 by rivets 8. The central hub 5 is engaged with a pre-damper, in particular by means of a hub body 9. The hub body 9 is mounted on the driven shaft (not shown) of the gearbox and transmits the drive torque via splines formed on the inner bore thereof.

The coaxial parts 2 and 3 are rotatably mounted relative to each other against damping means that comprise, in this case, helical compression springs 4 and means 10 for interfacing with the two coaxial parts 2 and 3. More specifically, the interfacing means comprise spring seats 10 placed at the ends of the springs 4 and protuberances 30 formed in the guide elements 3 and in the torque transmission plate 2. The spring seats 10 are suitable for interacting with the protuberances 30 formed in the guide elements 3 and/or the torque transmission plate 2 about a pivot connection.

The torque transmission plate 2, made from punch-pressed and/or die-stamped sheet steel, comprises two parallel walls and an edge corresponding to the thickness of the sheet. Likewise, each guide element 3, made from punch-pressed and/or die-stamped sheet steel, comprises two parallel walls and an edge corresponding to the thickness of the sheet.

During the torque transmission phases, the helical compression springs 4 compress under the effect of the rotation of the torque transmission plate 2 relative to the guide elements 3 about the axis of rotation X. The transmission of the torque and the filtering of the engine cyclic irregularities takes place by successive compression and relaxation of the springs 4. Friction means comprising at least one spring washer and one friction washer may be positioned between the torque transmission plate 2 and one or the other of the guide elements 3 in order to limit the amplitude of the cyclic irregularities.

The arrangement of the aforementioned interfacing means, including the spring seat 10, according to a preferred embodiment of the invention, will now be described in more detail with reference to FIGS. 3 to 6.

The seat 10 comprises a circular disc, of small thickness relative to its diameter, comprising two faces: a frontal face 12 suitable for interacting with one end of the helical compression springs 4, and a dorsal face 11 backing onto the frontal face 12 on the other side of the circular disc.

In order to ensure satisfactory relative positioning of the end of the springs 4 on the seat 10, the frontal face 12 comprises a centring flange 14 protruding from said frontal face 12. The centring flange 14 is in this case circular about an axis Y passing along the axis of springs, and centres the outer and inner springs.

The dorsal face 11 defines a geometric plane P, referred to as the plane of the seat 10, substantially perpendicular to an axis Y of the circular disc. The geometric plane P will be used as a reference for defining the geometry of the indentation.

In order to facilitate the compression of the springs 4 during the torque transmission phases in the friction clutch disc 100, each seat 10 comprises an indentation **40*a* extending inwards from the dorsal face 11 and the protuberances 30 enter the indentation 40*a*, which is common to the torque transmission plate 2 and the two guide elements 3. The protuberances 30 have a convex shape and bear on indentations 40*a*** having concave shapes in order to form a pivot connection.

In the first embodiment of the invention, the indentation **40*a* is produced in the form of a central cavity 40*a*. The central cavity comprises, in addition to a rounded bottom, two bearing surfaces and two lateral flanges. The central cavity 40*a*** does not emerge on the edges of the seat.

The central cavity **40*a* of the seat 10 is concave and comprises a rounded bottom 41 defined by a pivoting radius R, the protuberance 30 of the torque transmission plate 2 and the protuberances 30 of the two guide elements 3 bearing on the pivoting radius R of the rounded bottom 41**. The pivoting radius R is offset relative to the geometric plane P. The offset may be between 1 and 10 mm.

The central cavity **40*a* also comprises two bearing surfaces 45 arranged to bear on the edges of the torque transmission plate and the two guide elements when the springs are compressed, each bearing surface 45 being tangent to the pivoting radius R of the rounded bottom 41. The central cavity 40*a* has, in cross-section in the mid-plane P' passing through the axis of the springs, a prismatic shape comprising the two substantially planar bearing surfaces 45** moving away from each other in the direction of the dorsal face, the prismatic shape having an angle $\alpha$ of between 30° and 70°.

Finally, the central cavity **40*a* comprises two lateral flanges 42 respectively bearing on the outer walls 3*a* of the two guide elements 3**.

The central cavity **40*a* enters the material of the set 10 from the geometric plane P defining the dorsal face 11 in the direction of the axis of the springs Y. The central cavity 40*a* has, in a plane P' passing along the axis Y and perpendicular to the axis X, a rounded base 41 having a substantially circular shape of centre C. Finally, the connection between each of the bearing surface 45 and the dorsal face 11** is produced by a fillet having a radius.

The spring seat 10 also comprises, on the dorsal face 11, two protruding retaining lugs 17 distributed on either side of the plane P'. The retaining lugs 17 are axially spaced apart by a distance slightly greater than the thickness of the torque transmission plate 2 and extend parallel to this plane P' over the height of the seat. The torque transmission plate 2 is positioned between the retaining lugs 17. As a result, the spring seat 10 is positioned axially with respect to the torque transmission plate 2.

Figure 4:
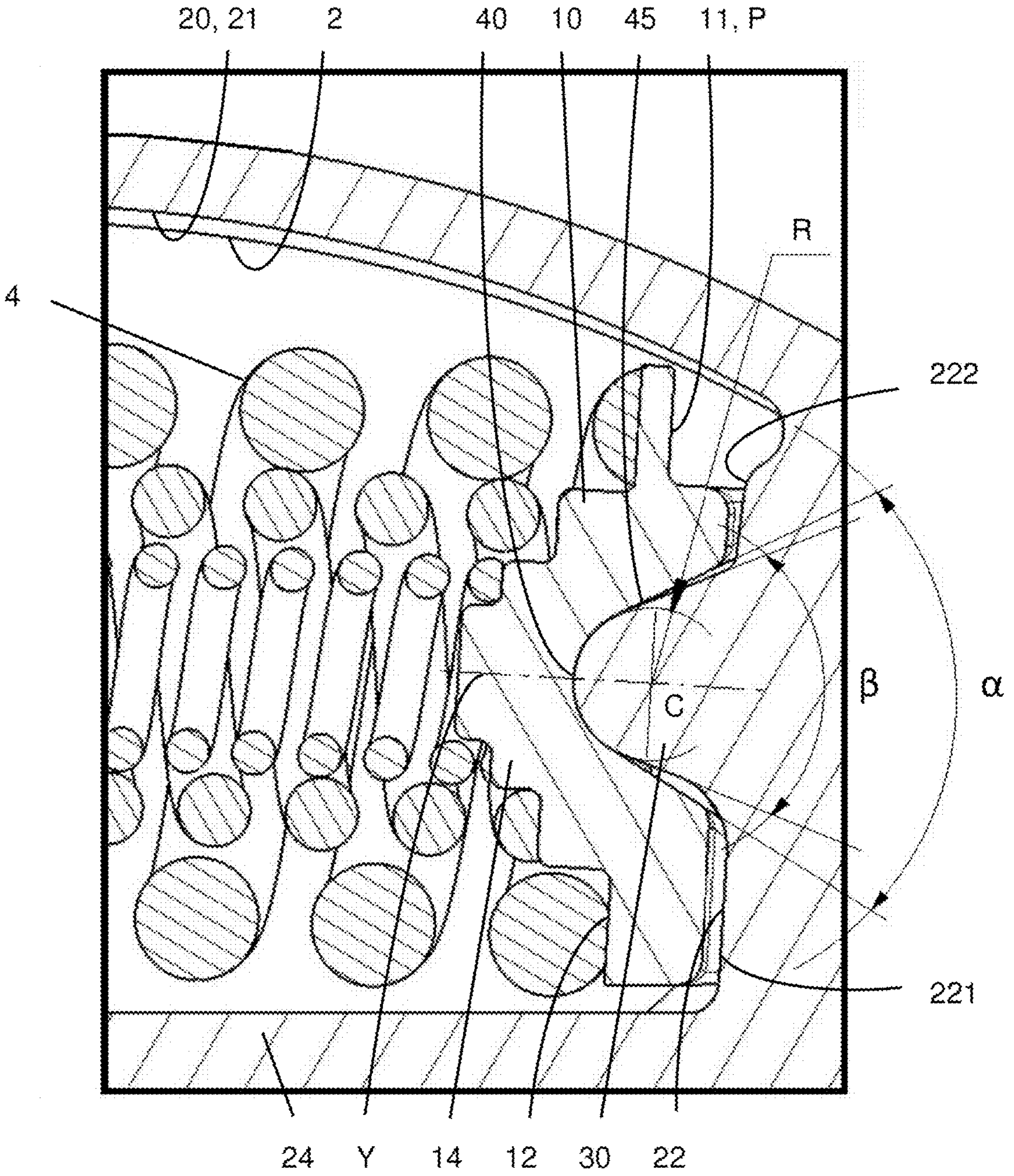
FIG. 4 is a cross-sectional view of the vibration damping device in a rest position according to the first embodiment of the invention in FIG. 1.

As illustrated schematically in FIG. 4 from the plane P', the dorsal face 11 and the central cavity 40*a* are suitable for being received in a window 20 provided for this purpose in the guide elements 3 and the torque transmission plate 2. The window 20 in the torque transmission plate 2 has a closed contour, as do the windows 20 in the guide elements 3. Each of the windows 20 comprises a radially outer band 21, two radial support surfaces 22 supporting the convex protuberances 30 and a radially inner edge 24. The radially inner edge 24 is formed by the central part of the torque transmission plate 2.

In this example, the torque transmission plate 2 comprises four windows 20 evenly distributed about the axis of rotation X. Each window 20 holds in position a sub-assembly of three concentric helical compression springs 4 supported by two seats 10.

Generally, the window 20 is substantially complementary to the part of the seat described above with which it is made to interact. To this end, in the plane P', the radial support surface 22 comprises a convex protuberance 30. This protuberance 30 comprises a rounded end surface 31 having a substantially circular cross-section and two substantially planar sides 32, 33. The protuberance 30 has a prismatic shape that is substantially complementary to the prismatic shape of the central cavity 40*a* described above and is suitable for being received in said central cavity 40*a*. The substantially planar sides 32, 33 are the sides of a prismatic shape having an acute angle β of between 20° and 60°, which move away from each other in the direction of the radial support surface 22.

As illustrated in FIG. 4, the angle α of the central cavity 40*a* is greater than the acute angle β of the protuberance 30. The difference in angle between the central cavity 40*a* and the protuberance 30 is of the order of 10°.

On either side of the protuberance 30, the radial support surface 22 has a first, inner edge 221 and a second, outer edge 222, both of which are substantially planar. The two edges 221 and 222 are not parallel to each other. The first, inner edge 221 and the second, outer edge 222 act as a stop with respect to the seat 10 when the pivot connection according to the invention is implemented, the operation of which will be described hereinafter.

Figure 5:
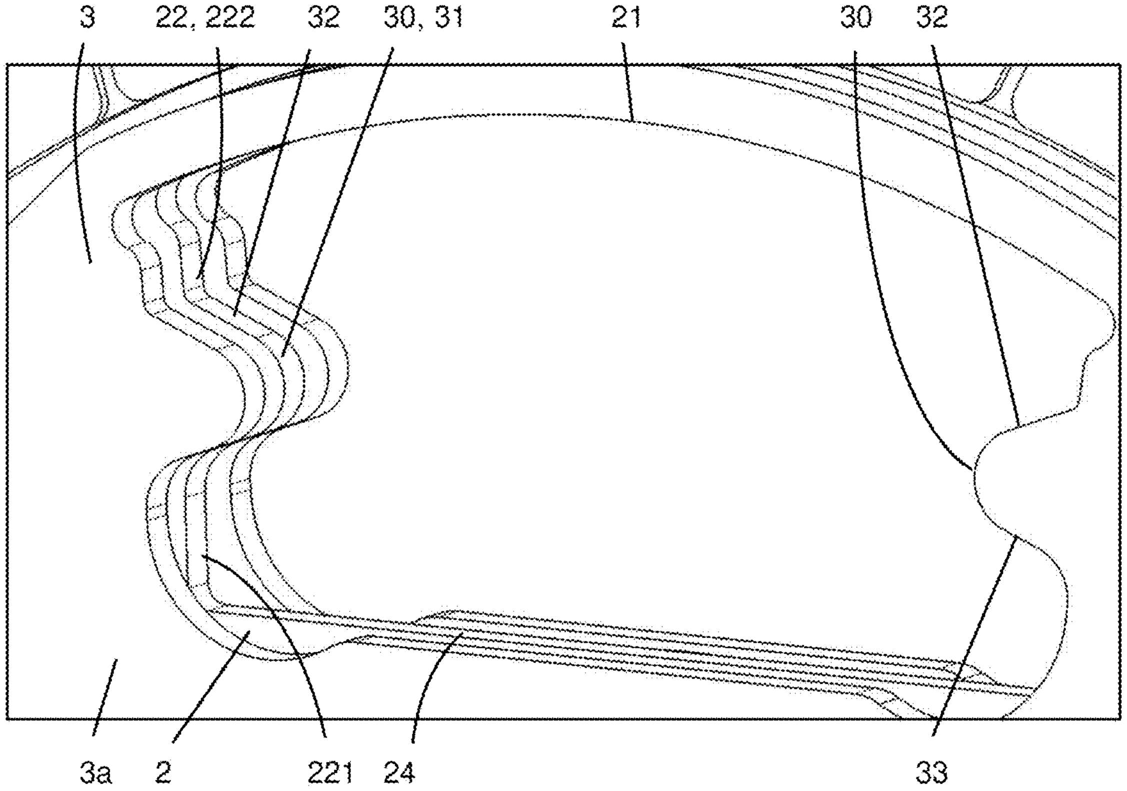
FIG. 5 is a partial view of the vibration damping device in a rest position according to the first embodiment of the invention in FIG. 1.
Figure 6:
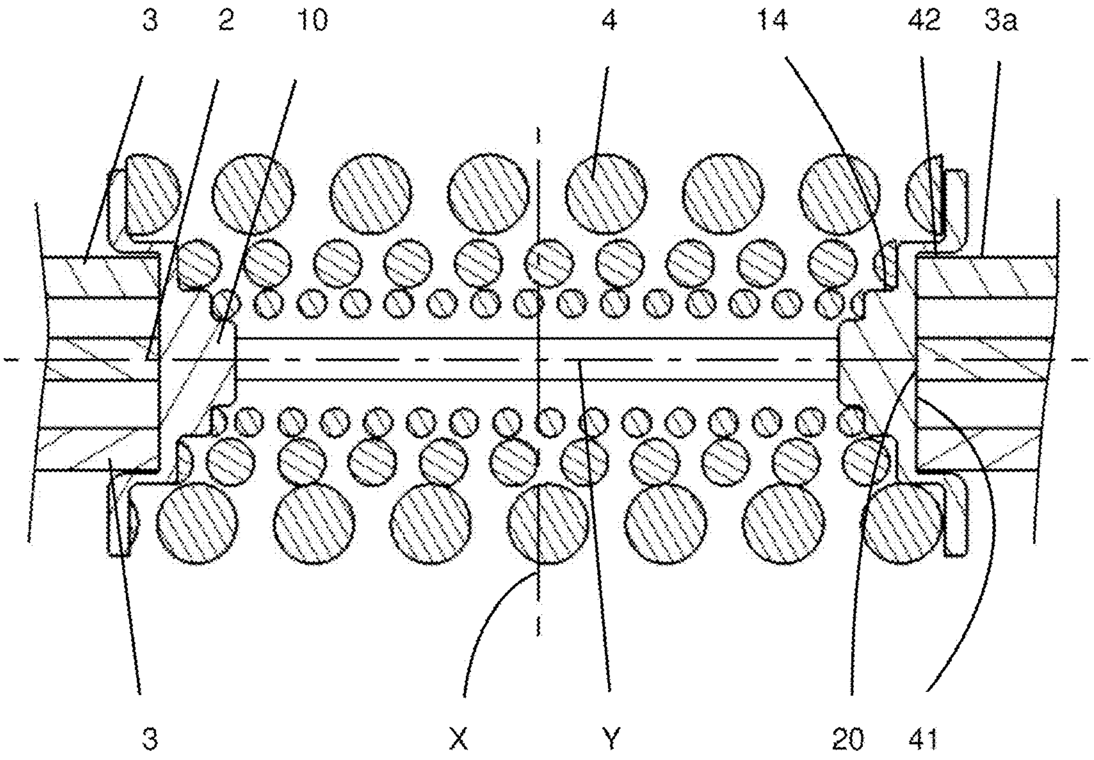
FIG. 6 is another cross-sectional view of the vibration damping device in a rest position according to the first embodiment of the invention in FIG. 1.

As illustrated in FIGS. 5 and 6, the window 20 exhibits mirror symmetry with respect to a mid-line embodied by the vertical axis passing through X.

The operation of the preferred embodiment of the invention will now be described with reference to FIGS. 3 to 6.

FIG. 4 illustrates the state of the vibration damping device 1 according to the invention at rest or the state of this same device without angular travel between the guide elements 3 and the torque transmission plate 2 or a centrifugal force being exerted on the springs.

The seat 10 is bearing on the protuberance 30 of the torque transmission plate 2. In this exemplary embodiment, the dorsal face 11 of the seat 10 is not bearing on the first, inner edge 221. Likewise, the substantially planar sides 32, 33 of the prismatic shape of the protuberance are not in contact with the bearing surface 45 of the central cavity 40*a*.

Under the effect of the speed of rotation of the drive shaft on the vehicle, the seat 10 will tend to pivot naturally towards the outside of the window 20 under the effect of the centrifugal movement of the three concentric helical compression springs 4. The second, outer edge 222 acts as a stop with respect to the seat 10 during rotation on the vehicle. Beyond a predetermined speed of rotation, for example 1,800 rpm, the seat 10 pivots around the pivot connection and abuts against the second, outer edge 222. The upper bearing surface 45 of the central cavity 40*a* is also bearing on the substantially planar upper side 32 of the prismatic shape of the protuberance 30. The seat 10 is then held on the radial support surface 22 and is not ejected.

During a torque transmission phase in the transmission, the torque transmission plate 2 rotates relative to the guide elements 3 through an angle that may be up to 15° for example. In this configuration, one of the seats is now bearing on the torque transmission plate 2 and the other seat 10 is bearing on the guide element 3. Each seat 10 pivots in the central cavity 40*a* about the respective protuberance 30 of the torque transmission plate 2 or the guide element 3. The seats are driven in this pivoting by the deformation of the concentric helical compression springs 4. The seats may further be subject to the effect of the centrifugal force. Below 1,800 rpm, the seats 10 pivot about the pivot connection so that the frontal faces 12 of the two seats 10 remain parallel.

In the extreme case of maximum torque passing through the transmission, the concentric springs 4 are in a state of maximum compression. The angular travel between the guide elements 3 and the torque transmission plate 2 is then at a maximum. The pivoting of the seat 10 on the protuberance 30 of the guide element 3 and on the protuberance 30 of the torque transmission plate 2 continues. When the helical compression springs 4 are in a state of maximum compression, the frontal faces 12 of the seats are substantially parallel. The seats 10 are not ejected.

In one variant embodiment of the invention, not shown, the geometric plane P of the dorsal face 11 is suitable for bearing on the first, inner edge 221 when the vibration damping device 1 is at rest, that is, without angular travel between the two guide elements 3 and the torque transmission plate 2 and without centrifugal force exerted on the springs.

A second embodiment of the invention that differs from the first embodiment in that the indentation 40 emerges on the edges of the seat 10 will now be described with reference to FIG. 7.

In this second embodiment, the indentation 40 is produced in the form of a groove having an elongate shape that emerges on the edges of the seat 10. This second embodiment of the invention promotes the assembly of the springs in the vibration damping device.

Figure 7:
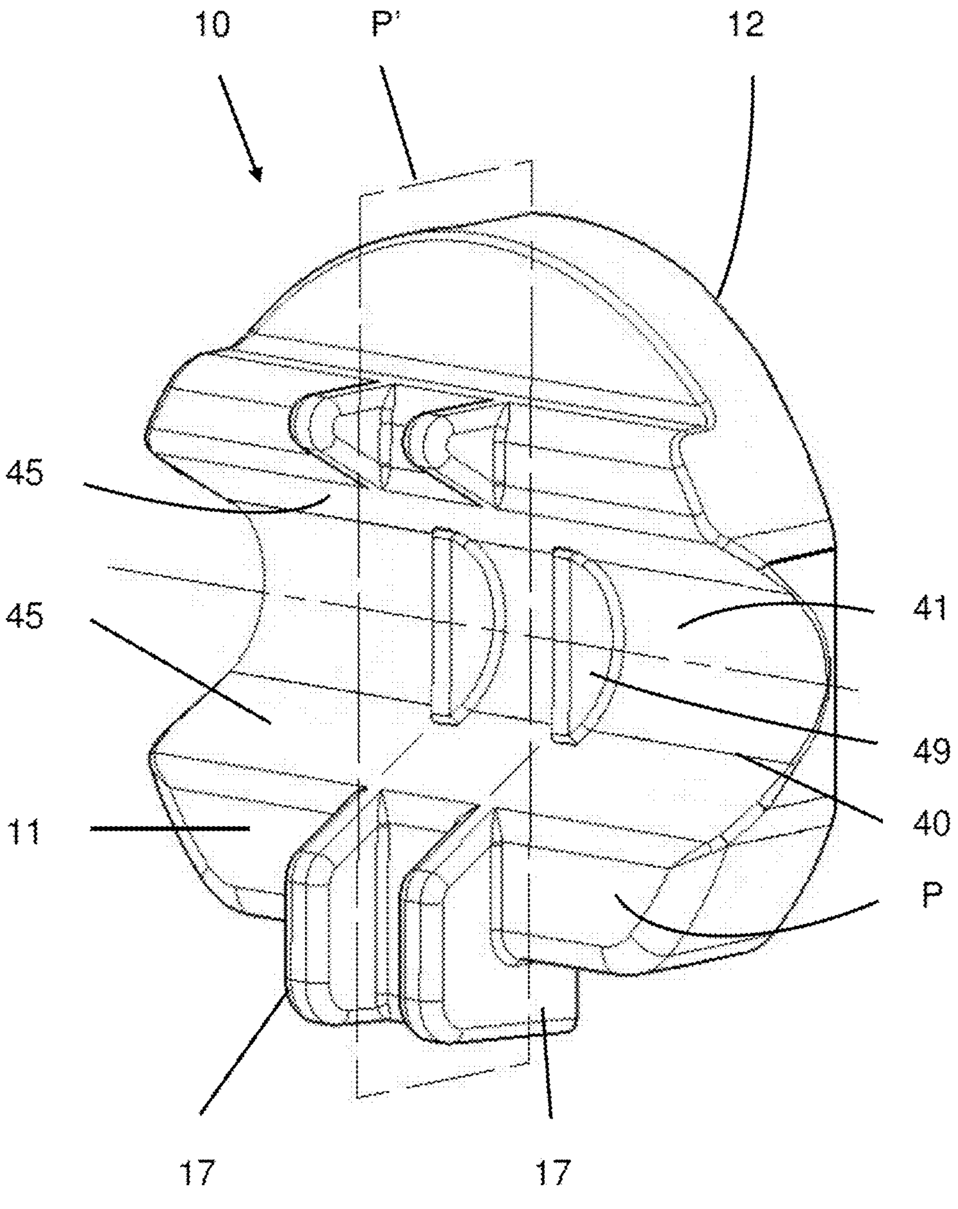
FIG. 7 is an isometric view of a friction seat according to a second embodiment of the invention.

As illustrated in FIG. 7, the rounded bottom 41 of the indentation 40 comprises spacer lugs 49 extending in the direction of the torque transmission plate from the rounded bottom and which are interposed between the torque transmission plate 2 and the two guide elements 3.

In this second embodiment, the vibration damping device 1 has the same architecture as described in the first embodiment and the general operation is also the same.

In a variant embodiment of the invention, the spring seat 10 may be obtained by machining, forging, stamping, by moulding a metal or a synthetic material, by compressed powder technology or by additive manufacturing technology.

The invention is not limited to the two exemplary embodiments of the invention that have just been described. According to another aspect of the invention, the vibration damping device may take the form of a dual-mass flywheel.

In this other exemplary embodiment of the invention, the dual-mass flywheel comprises a first flywheel, also known as a primary flywheel, acting as the torque input element for the vibration damping device, and a second flywheel, also known as a secondary flywheel, acting as the torque output element of the vibration damping device. The two, primary and secondary, flywheels are mounted coaxially with each other about an axis of rotation X of the dual-mass flywheel.

In this vibration damping device, the first inertial mass is fastened to one of the guide elements and the second inertial mass is fastened to the torque transmission plate. For example, the two, primary and secondary, flywheels are rotatably mounted with respect to each other against helical compression springs and means 10 for interfacing with the two flywheels. More specifically, the interfacing means comprise spring seats placed at the ends of the springs, and guide elements flanking a secondary plate. In this other exemplary embodiment of the invention, the seat has all of the features presented in the first embodiment of the invention.

The vibration damping device 1 may also be incorporated into a transmission of a "hybrid" automotive vehicle comprising a combustion engine and an electric motor. In this "hybrid" transmission, the torque input of the vibration damping device 1 takes place downstream of the combustion engine and the torque output of the vibration damping device 1 is rigidly connected directly or indirectly to the rotor of the electric motor for conjoint rotation.

The invention claimed is:

1. Vibration damping device for an automotive vehicle, comprising:

a torque transmission plate;

two rotatably connected guide elements that are coaxial along an axis of rotation and positioned on either side of said torque transmission plate;

helical compression springs bearing on the torque transmission plate and the guide elements by means of seats positioned on the ends of the springs, wherein each seat comprises:

a frontal face suitable for interacting with an end of the springs, comprising a centring flange, the centring axis of which is coincident with the axis of the springs, a dorsal face defining a geometric plane backing onto the frontal face, and an indentation extending along the axis of the springs inwards from the dorsal face, wherein each seat bears on protuberances formed respectively on the torque transmission plate and the two guide elements so as to interact about a pivot connection, and the protuberances enter the indentation, which is common to the torque transmission plate and the two guide elements.

2. Vibration damping device according to claim 1, wherein the indentation is concave and comprises a rounded bottom defined by a pivoting radius, the protuberance of the torque transmission plate and/or the protuberances of the two guide elements bearing on the pivoting radius of the rounded bottom.

3. Vibration damping device according to claim 2, wherein the indentation comprises two bearing surfaces arranged to bear on the protuberances of the torque transmission plate and the two guide elements when the springs are compressed, each bearing surface being tangent to the pivoting radius of the rounded bottom.

4. Vibration damping device according to claim 3, wherein the indentation has, in cross-section in a mid-plane passing along the axis of the springs, a prismatic shape comprising the two substantially planar bearing surfaces moving away from each other in the direction of the dorsal face, the prismatic shape having an angle (α) of between 30° and 70°.

5. Vibration damping device according to claim 4, wherein the bearing surfaces are curved, for example with an involute or polynomial.

6. Vibration damping device according to claim 3, wherein the indentation is a groove having an elongate shape that emerges on opposite edges of the seat and the rounded bottom of the indentation comprises spacer lugs that extend in the direction of the torque transmission plate from the rounded bottom and are interposed between the torque transmission plate and the two guide elements.

7. Vibration damping device according to claim 2, wherein the indentation is a groove having an elongate shape that emerges on edges of the seat and the rounded bottom of the indentation comprises spacer lugs that extend in the direction of the torque transmission plate from the rounded bottom and are interposed between the torque transmission plate and the two guide elements.

8. Vibration damping device according to claim 2, wherein the torque transmission plate and the two guide elements each comprise at least one window for receiving the springs and two seats, each window comprising two protuberances positioned facing each other.

9. Vibration damping device according to claim 2, wherein the indentation is a central cavity that comprises two lateral flanges respectively bearing on respective outer walls of the two guide elements.

10. Dual-mass flywheel comprising a first inertial mass and a second inertial mass that are coaxial along an axis, and a vibration damping device according to claim 2, wherein the first inertial mass is held by the guide elements and the second inertial mass is held by the torque transmission plate.

11. Vibration damping device according to claim 1, wherein the torque transmission plate and the two guide elements each comprise at least one window for receiving the springs and two seats, each window comprising two protuberances positioned facing each other.

12. Vibration damping device according to claim 11, wherein each window comprises a radially outer band, two radial support surfaces supporting the two protuberances, each of which is convex, and a radially inner edge, so as to form a closed recess suitable for receiving the springs and seats.

13. Vibration damping device according to claim 12, wherein each protuberance comprises a rounded end surface and two substantially planar sides, the substantially planar sides being the sides of a prismatic shape having an acute angle (β) of between 20° and 60°, which move away from each other in the direction of a respective radial support surface.

14. Vibration damping device according to claim 13, wherein an angle (α) of the indentation is greater than the angle (β) of the protuberance.

15. Vibration damping device according to claim 13, wherein a lateral bearing surface has a first edge and a second edge suitable for coming into abutting contact with the dorsal face of the seat when the pivot connection is implemented, the two edges not being parallel to each other.

16. Vibration damping device according to claim 12, wherein a lateral bearing surface has a first edge and a second edge suitable for coming into abutting contact with the dorsal face of the seat when the pivot connection is implemented, the two edges not being parallel to each other.

17. Vibration damping device according to claim 1, wherein the indentation is a central cavity that comprises two lateral flanges respectively bearing on respective outer walls of the two guide elements.

18. Vibration damping device according to claim 17, wherein the central cavity penetrates beyond the frontal face of the seat in the direction of the axis of the springs.

19. Dual-mass flywheel comprising a first inertial mass and a second inertial mass that are coaxial along an axis, and a vibration damping device according to claim 1, wherein the first inertial mass is held by the guide elements and the second inertial mass is held by the torque transmission plate.

20. Friction clutch disc comprising a friction disc provided with friction linings and a vibration damping device according to claim 1, wherein the friction disc is attached to one of the guide elements or to the torque transmission plate.

* * * * *